United States Patent
Ellison et al.

(10) Patent No.: US 7,259,120 B2
(45) Date of Patent: Aug. 21, 2007

(54) ALUMINUM TITANATE CERAMIC ARTICLES AND METHODS OF MAKING SAME

(75) Inventors: Adam James Gillmar Ellison, Painted Post, NY (US); Patrick David Tepesch, Corning, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 61 days.

(21) Appl. No.: 11/064,347

(22) Filed: Feb. 22, 2005

(65) Prior Publication Data

US 2006/0281627 A1    Dec. 14, 2006

Related U.S. Application Data

(60) Provisional application No. 60/564,081, filed on Apr. 21, 2004.

(51) Int. Cl.
*C04B 35/478* (2006.01)
*B01D 39/20* (2006.01)

(52) U.S. Cl. ............ 501/134; 501/127; 501/128; 501/152; 55/523

(58) Field of Classification Search ......... 501/127, 501/128, 134, 136, 152; 55/523
See application file for complete search history.

(56) References Cited

U.S. PATENT DOCUMENTS

| | | | |
|---|---|---|---|
| 3,316,965 A | 5/1967 | Watanbe et al. | 166/33 |
| 4,118,240 A | 10/1978 | Takabatake | 106/73.33 |
| 4,194,917 A | 3/1980 | Sakemi et al. | 106/62 |
| 4,277,539 A | 7/1981 | Keller et al. | 428/450 |
| 4,306,909 A | 12/1981 | Oda et al. | 501/112 |
| 4,307,198 A | 12/1981 | Oda et al. | 501/119 |
| 4,327,188 A | 4/1982 | Endo et al. | 501/134 |
| 4,415,344 A | 11/1983 | Frost et al. | 55/523 |
| 4,417,908 A | 11/1983 | Pitcher, Jr. | 55/523 |
| 4,420,316 A | 12/1983 | Frost et al. | 55/523 |
| 4,483,944 A | 11/1984 | Day et al. | |
| 4,521,532 A | 6/1985 | Cho | 502/439 |
| 4,598,054 A | 7/1986 | Mochida et al. | 501/112 |
| 4,758,542 A | 7/1988 | Parker | 501/134 |
| 4,767,731 A | 8/1988 | Asami et al. | 501/128 |
| 4,855,265 A | 8/1989 | Day et al. | 501/128 |

(Continued)

FOREIGN PATENT DOCUMENTS

DE    3644664    * 7/1988

(Continued)

*Primary Examiner*—Karl Group
(74) *Attorney, Agent, or Firm*—Joseph M. Homa; Randall S. Wayland (57) ABSTRACT

An aluminum titanate ceramic article having a predominant crystal phase of aluminum titanate and a material composition including aluminum, titanium, silica, an alkaline earth metal (e.g., at least one selected from the group of strontium, calcium, barium, or combinations), and a rare earth metal (e.g., at least one selected from the group consisting of yttrium, lanthanum, and combinations) and methods of making such aluminum titanate bodies are described. An oxide of yttrium metal or lanthanide metals is preferably used as a sintering aid in combination with the other compositional components to enable firing of the resulting green body at a lower heating temperature of less than 1500° C., and more preferably between 1400°-1450° C., with a preferable hold time of less than 8 hours, more preferably of 6 to 8 hours.

23 Claims, 5 Drawing Sheets

U.S. PATENT DOCUMENTS

| | | | |
|---|---|---|---|
| 4,900,703 A | 2/1990 | Ono et al. ................... | 501/136 |
| 4,915,887 A | 4/1990 | Day et al. ..................... | 264/56 |
| 4,985,815 A | 1/1991 | Endo ........................... | 362/294 |
| 5,008,222 A | 4/1991 | Kameda ....................... | 501/134 |
| 5,153,153 A | 10/1992 | Freudenberg et al. ....... | 501/127 |
| 5,288,672 A | 2/1994 | Gugel et al. ................. | 501/134 |
| 5,290,739 A | 3/1994 | Hickman ..................... | 501/128 |
| 5,346,870 A | 9/1994 | Noguchi et al. ............. | 501/136 |
| 5,422,324 A | 6/1995 | Noguchi et al. ............. | 501/128 |
| 5,676,833 A | 10/1997 | Odaka et al. .......... | 210/500.26 |
| 5,846,276 A | 12/1998 | Nagai et al. .................. | 55/523 |
| 6,101,793 A | 8/2000 | Nagai et al. .................. | 55/523 |
| 6,197,248 B1 | 3/2001 | Fukuda et al. .............. | 264/658 |
| 6,322,605 B1 | 11/2001 | He et al. ...................... | 55/523 |
| 6,328,779 B1 | 12/2001 | He et al. ...................... | 55/523 |
| 6,620,751 B1 | 9/2003 | Ogunwumi .................. | 501/134 |
| 6,696,132 B2 | 2/2004 | Beall et al. .................. | 428/116 |
| 6,843,822 B2 | 1/2005 | Beall et al. .................. | 55/523 |
| 6,942,713 B2 | 9/2005 | Ogunwumi et al. .......... | 55/523 |
| 7,001,861 B2 | 2/2006 | Beall et al. .................. | 501/128 |
| 7,071,135 B2 | 7/2006 | Ogunwumi et al. ........ | 501/134 |
| 2003/0015829 A1 | 1/2003 | Fukuda et al. .............. | 264/674 |

FOREIGN PATENT DOCUMENTS

| | | |
|---|---|---|
| GB | 1081142 | 8/1987 |
| JP | 5-58722 * | 3/1993 |
| WO | 2004/011124 | 2/2004 |

* cited by examiner

ALUMINUM TITANATE CERAMIC ARTICLES AND METHODS OF MAKING SAME

This application claims the benefit of, and priority to, U.S. Provisional Application No. 60/564,081, filed Apr. 21, 2004, entitled "Method of Making Aluminum Titanate Bodies," by Ellison et al.

BACKGROUND OF THE INVENTION

The invention relates to aluminum titanate ceramic bodies having low thermal expansion, high porosity, and high strength and methods for manufacturing the same. Particularly, the present invention relates to aluminum titanate ceramic bodies and methods of manufacturing same wherein the body and method uses a sintering additive which aids in reducing the firing temperature and allowing for a wide range of firing temperature.

Recently, aluminum titanate (AT) based ceramic materials have been proposed, in patent applications U.S. application Ser. Nos. 10/626,317 (U.S. Publication No. 2004/0092381 now U.S. Pat. No. 7,001,861) and 60/517,348 (now U.S. application Ser. No. 10/955,364 now U.S. Pat. No. 6,942,713) and in U.S. Pat. No. 6,620,751 as an alternative for cordierite and silicon carbide (SiC) for high temperature applications, such as automotive emissions control applications.

Diesel particulate filters (DPFs) require a combination of low coefficient of thermal expansion (CTE) (for thermal shock resistance), high porosity and good pore interconnectivity (for low pressure drop and engine efficiency), and high strength (to survive handling, canning, and vibration in use).

To obtain aluminum titanate-based DPFs exhibiting the aforementioned properties it is required to fire the structures at high temperatures, generally above 1500° C., in order to achieve sufficient grain growth to produce the microcracking required for low thermal expansion. The high firing temperatures disadvantageously add cost to the processing of the product.

It would be desirable to manufacture aluminum titanate-based bodies for use in high temperature applications which can be fired at reduced temperatures without significantly impacting the desired properties in the final product structure. Accordingly, ceramic compositions achieving the aforementioned properties which enable lower firing temperatures are desired.

SUMMARY OF THE INVENTION

According to a first aspect of the invention, a method of making an aluminum titanate ceramic body is provided comprising the steps of first formulating a batch of inorganic raw materials comprising sources of silica, alumina, titania, and an alkaline earth metal (preferably at least one selected from the group consisting of strontium, calcium and barium). A rare earth metal oxide, preferably in an amount of 0.01 to 10%, and in some embodiments, 0.01 to 2.0%, expressed on a weight percent oxide basis, is added to the batch of raw materials. It has been found that the addition of the rare earth metal oxide sintering aid in combination with the other inorganic materials advantageously lowers the firing temperature at which the bodies can be processed, while at the same time desirably lowering the CTE and increasing the porosity, without substantially reducing the strength of the final fired body. Advantageously, lowering the firing temperature significantly increases furnace furniture life. The rare earth metal oxide is preferably either an oxide of yttrium or an oxide of the lanthanide series. Most preferably, the rare earth metal oxide comprises $La_2O_3$. These additions also result in stable properties over a wider range of firing temperatures.

The batch of raw materials is further mixed together with processing aids selected from the group consisting of plasticizers, lubricants, binders, pore formers, and solvents (such as water). The processing aids are added to the batch of inorganic raw materials as superadditions based on 100% by weight of inorganic raw materials.

The batch components and superadditions are mixed together to form a preferably homogeneous and plasticized mixture, which is thereafter shaped into a green body. The shaping step can be performed according to well-known ceramic processing techniques, and is most preferably formed by extrusion of the plasticized mixture through an extrusion die. In one embodiment the plasticized mixture is extruded through a die to form a green body preferably having a honeycomb structure formed of intersecting cell walls.

The green body is optionally dried, and then preferably fired to a maximum (top) temperature of less than 1500° C., more preferably less than 1450° C., and most preferably between 1400°-1450° C., with a hold time at the top temperature sufficient to form a predominant phase of aluminum titanate. The hold time is preferably less than 8 hours; more preferably between 6 to 8 hours. Preferably, a minor phase of an alkaline earth metal feldspar may also be formed. Minor phases of alumina may also be present in the ceramic.

In one aspect of the invention, the resulting ceramic article having the form of a honeycomb structure is formed into a DPF which is comprised of a plugged, wall-flow honeycomb body having an inlet end and an outlet end and a multiplicity of cells extending from the inlet end to the outlet end. The cells preferably have porous cell walls, wherein part of the total number of cells at the inlet end are plugged along a portion of their lengths to form outlet cells, and the remaining part of cells that are open at the inlet end are plugged at the outlet end along a portion of their lengths to form the inlet cells. In a preferred engine exhaust filtration application, an engine exhaust stream passing through the inlet cells of the honeycomb from the inlet end to the outlet end flows into the open inlet cells, through the cell walls, and out of the structure through the open outlet cells at the outlet end.

Preferably, the inlet cells and outlet cells have non-equal transverse cross-sections, which are most preferably square. Preferred thicknesses of the cell walls for the article are less than 0.06 in (1.52 mm). Cell densities are preferably between 10-800 cells/in$^2$ (1.6-124 cells/cm$^2$). The article preferably exhibits internal interconnected porosity of greater than 40% by volume, in some embodiments greater than 45%, and in select embodiments, greater than 50%. Preferable median pore size is greater than 10 μm. Preferably, the article exhibits low Coefficient of Thermal Expansion (CTE), as measured between RT-1000° C., of $15 \times 10^{-7}$/° C. or less, more preferably less than $10 \times 10^{-7}$/° C., and in some embodiments, even less than $5 \times 10^{-7}$/° C. Desirably, certain embodiments achieve a combination of porosity of greater than 40% by volume while also achieving CTE, measured between Room Temperature (RT) and 1000° C., of $10 \times 10^{-7}$/° C. or less.

According to another broad aspect, the invention is an aluminum titanate ceramic article, comprising a predominant crystal phase of aluminum titanate and a material composition including aluminum, titanium, silicon, a rare earth metal, and an alkaline earth metal. The alkaline earth metal is preferably selected from the group consisting of strontium, calcium, barium, and combinations thereof. The rare earth metal is preferably selected from the group consisting of yttrium, lanthanum, and combinations thereof. It should be recognized that these metals and silicon are generally provided in the composition as oxides.

According to preferred embodiments, the composition further comprises, as expressed on a weight percent oxide basis, a $(Al_2O_3.TiO_2)$+b $(CaO.Al_2O_3.2SiO_2)$+c $(SrO.Al_2O_3.2SiO_2)$+d $(BaO.Al_2O_3.2SiO_2)$+e $(3Al_2O_3.2SiO_2)$+f $(Al_2O_3)$+g $(SiO_2)$+h $(Fe_2O_3.TiO_2)$+i $(La_2O_3)$+j $(La_2O_3.4TiO_2.6Al_2O_3)$+k $(LaAlO_3)$ where a, b, c, d, e, f, g, h, i, j and k are weight fractions of each component such that (a+b+c+d+e+f+g+h+i+j+k=1.000), and where $0.5 \leq a \leq 0.95$, $0.0 \leq b \leq 0.5$, $0.0 \leq c \leq 0.5$, $0.0 \leq d \leq 0.5$, $0.0 \leq e \leq 0.5$, $0.0 \leq f \leq 0.25$, $0.0 \leq g \leq 0.1$, $0.0 \leq h \leq 0.03$, and i+j+k>0.001 and b+c+d>0.001.

According to other embodiments of the invention, the composition further comprises, as expressed on a weight percent oxide basis, 40-65% $Al_2O_3$; 25-40% $TiO_2$; 3-12% $SiO_2$; 2-10% of at least one alkaline earth metal oxide selected from the group of SrO, CaO, BaO, and combinations thereof; and 0.01-10% of a rare earth oxide, such as $La_2O_3$, $Y_2O_3$, or combinations thereof. Iron oxide may be provided in preferred amounts of between 0.01 and 0.35%, as expressed on a weight percent oxide basis.

The inventive aluminum titanate ceramic article is particularly useful for high temperature exhaust applications, such as wall-flow filters for diesel exhaust filtration, and automotive/vehicle catalytic converters. In addition to having a lower firing temperature and desirable porosity and CTE, the present invention may provide the additional advantage of having a broader firing window thereby making such ceramic articles easier and more cost effective to manufacture.

DETAILED DESCRIPTION OF THE INVENTION

The batch raw materials used in the method of the present invention include sources of silica, alumina, titania, and at least one alkaline earth metal. The alkaline earth metal is preferably selected from the group of strontium, barium, calcium, and combinations of these. The raw materials may also include, in combination with those listed above, iron oxide. Most preferably, the batch of inorganic raw materials, as expressed on a weight percent oxide basis, includes 40-65% $Al_2O_3$; 25-40% $TiO_2$; 3-12% $SiO_2$; and 2-10% of an alkaline earth metal oxide selected from the group consisting of SrO, CaO, BaO, and combinations thereof.

A suitable source of alumina is a powder which when heated to a sufficiently high temperature in the absence of other raw materials, yield substantially pure aluminum oxide, and includes alpha-alumina, a transition alumina such as gamma-alumina or rho-alumina, hydrated alumina, gibbsite, corundum, boehmite, aluminum hydroxide, and mixtures thereof. The median particle diameter of the alumina is preferably below 35 microns.

A suitable silica source includes cristobalite, non-crystalline silica such as fused silica or sol-gel silica, silicone resin, zeolite, and diatomaceous silica, kaolin, and quartz. The median particle size of the silica source is preferably less than 30 micrometers. A suitable titania source is rutile, anatase, or an amorphous titania. The median particle size of the titania source is important to avoid entrapment of unreacted oxide by the rapidly growing nuclei in the structure. Accordingly, the median particle size is preferably less than 20 micrometers. One suitable strontium source is strontium carbonate, with a median particle size of preferably less than 20 micrometers. Suitable barium sources are barium carbonate, barium sulfate, or barium peroxide, with a preferable median particle size of less than 20 micrometers. The calcium source may be either calcium carbonate or calcium aluminate, with a median particle size of preferably less than 20 micrometers. Iron oxide has a median particle size of preferably less than 0.5 micrometers.

Figure 8:
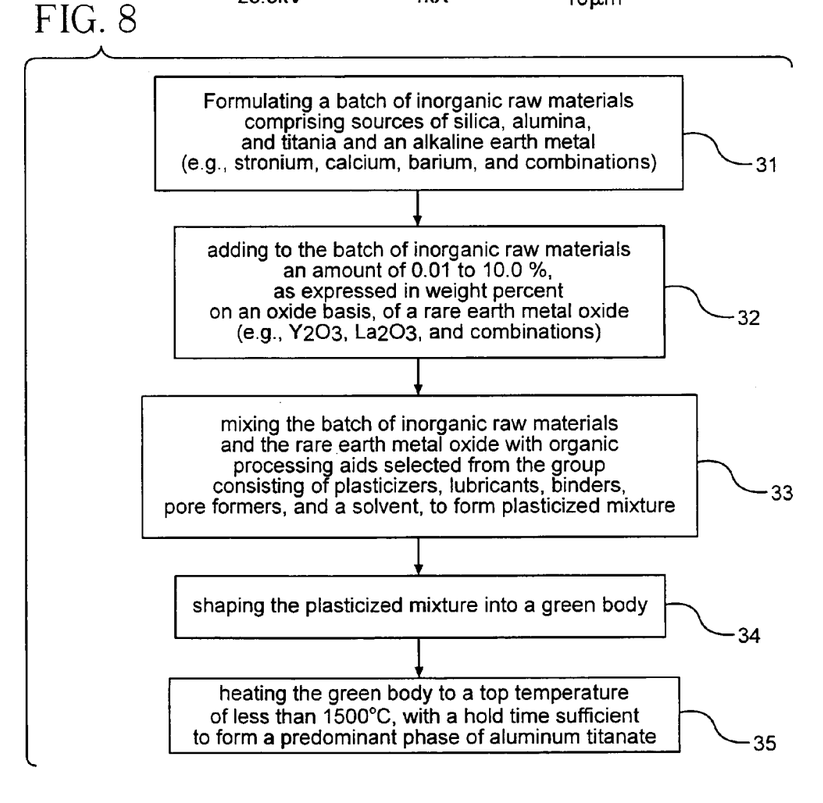
FIG. 8 is a block diagram illustrating the method steps according to another aspect of the invention.

The raw batch materials formulated in block 31 of FIG. 8 are batched and then mixed with a source of one or more rare earth oxides, most preferably oxides of the metal yttrium ($Y_2O_3$) or oxides of the lanthanide metals ($La_2O_3$), in block 32. The rare earth metal oxide has a median particle size of preferably less than 15 micrometers, and is preferably added in an amount of 0.01 to 10% by weight, and in some embodiments 0.01 to 2% by weight, to the other inorganic raw materials formulated in block 31.

To this mixture of components of inorganic raw material components and rare earth metal oxide it is further added, as shown in block 33, processing aids selected from the group of organic and/or organometallic binders, lubricants, plasticizers, pore formers, and aqueous or non-aqueous solvents to form a preferably homogenous and plastic mixture that can be shaped by molding or extrusion.

The pore former, such as graphite, starch or polyethylene may optionally be added in order to increase the porosity of the final product. The weight percent of the processing aids are computed as follows 100×[(processing aid)/(total wt. of inorganic raw materials)].

The plasticized mixture is shaped into a green body as shown in block 34 by any suitable ceramic manufacturing method, but preferably by extrusion. As known in the art, the extrusion operation can be done using a hydraulic ram extrusion, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

The resulting shaped green body may be preferably then dried. It is then heated as shown in block 35, preferably in air, and preferably in a conventional kiln to a maximum (top) temperature of less than 1500° C., more preferably between 1400 and 1500° C., more preferably yet between 1400°-1450° C., and in some embodiments between 1435°-1450° C. The body is preferably held in the desired temperature range for a sufficient hold time to form a predominant crystal phase of aluminum titanate. Additionally, a minor phase of an alkaline earth metal feldspar may be formed. Most preferably, the hold time at the firing temperature is for less than 8 hours, more preferably between approximately 6 to 8 hours before cooling to room temperature (RT).

Figure 1:
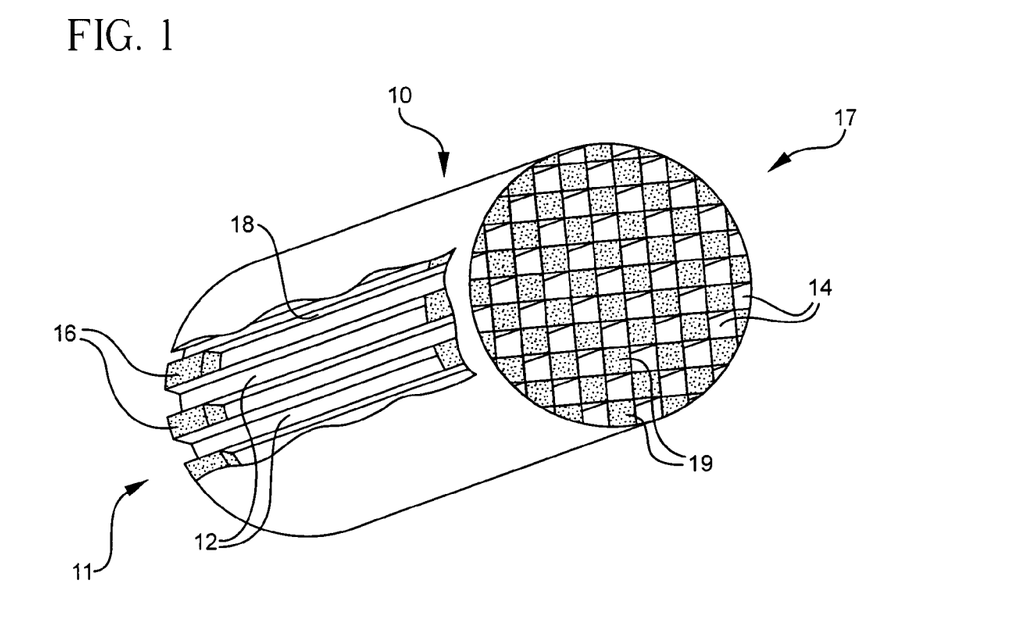
FIG. 1 is an isometric view of one aluminum titanate ceramic article according to the invention shown in the form of an end-plugged wall-flow filter.

The ceramic article according to the present invention, in one preferred implementation, may be formed into the shape of a honeycomb structure as best shown in FIG. 1. The honeycomb structure 10 preferably has a plurality of cell passages 12, 14 separated by cell walls 18 extending along the axial length of the article 10 from an inlet end 11 to an outlet end 17. According to a preferred aspect of the invention, the ceramic article 10 is a wall-flow filter and preferably has an inlet end 11 and an outlet end 17 and a multiplicity of inlet cells 12 extending from the inlet end to the outlet end and a plurality of outlet cells 14 extending from the inlet end to the outlet end alongside of the inlet cells 12; the cells 12, 14 having porous walls 18. It is preferred that the structure be plugged in a checkerboard pattern with a preferably ceramic paste to form plugs 16,19. The plugs 16, 19 preferably have the same or similar composition to that of the honeycomb structure, but this is not essential. Any suitable plugging material may be employed. The plugging is preferably performed only at the ends of the cells, typically to a depth of about 5 to 20 mm. Inlet cells 12 are plugged at the outlet end 17 with plugs 19, whereas outlet cells 14 are plugged at the inlet end 11 with plugs 16, in a preferably alternating fashion. Preferably, the number of inlet cells 12 is substantially equal to the number of outlet cells 14 in the article.

Thus, it should be recognized that for the plugged wall-flow honeycomb structure, part of the total number of cells at the inlet end 11 are plugged along a portion of their lengths, and the remaining part of cells that are open at the inlet end are plugged at the outlet end 17 along a portion of their lengths. This plugging configuration allows for engine exhaust stream passing through the inlet cells 12 of the honeycomb structure from the inlet end 11 to the outlet end 17 to flow into the open outlet cells 14, through the cell walls 18, and out of the structure through the open outlet cells at the outlet end. In particular, such wall flow filters can be used to trap particulates from the exhaust of diesel engines. In such applications, wall flow filters are termed "diesel particulate filters," in that they may trap and store particulates from the exhaust of diesel engines. Suitable cellular densities for diesel particulate filters range from 10-800 cells/in$^2$ (1.6-124 cells/cm$^2$); more preferably 70 cells/in$^2$ (10.9 cells/cm$^2$) to 300 cells/in$^2$ (46.5 cells/cm$^2$)

Figure 2:
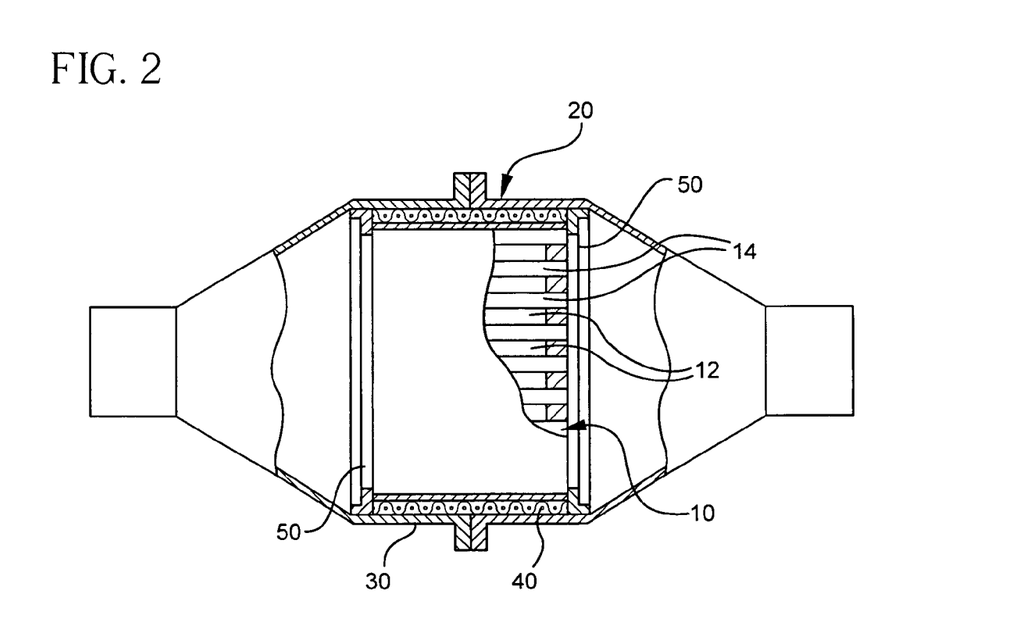
FIG. 2 is a partially sectioned side view of a diesel particulate filter including the aluminum titanate ceramic article of FIG. 1 according to further aspects of the invention.
Figure 3:
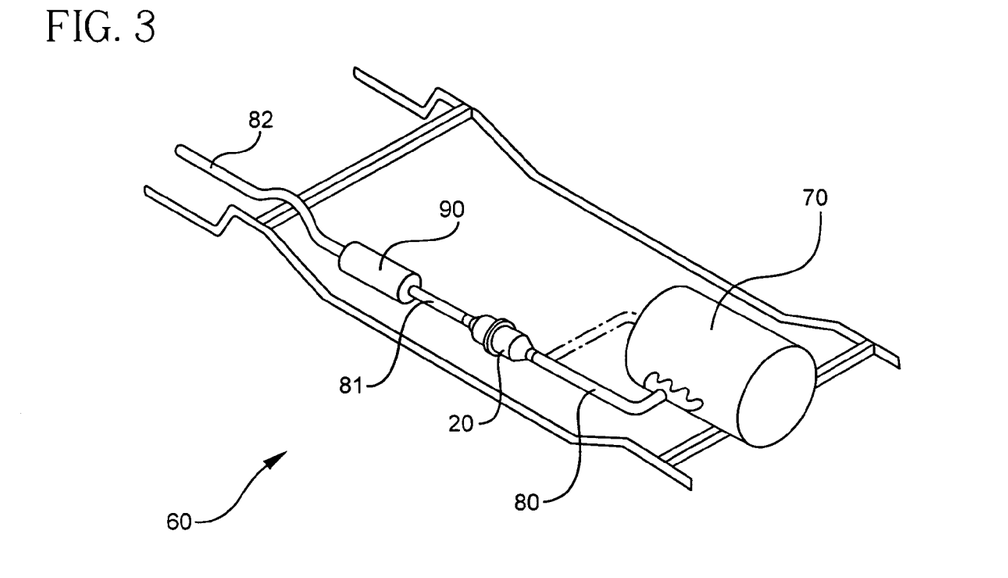
FIG. 3 is an isometric view of a system including the diesel particulate filter of FIG. 2 interconnected to an engine.

As best shown in FIG. 2, the ceramic article 10 may be configured as a diesel particulate filter 20. The diesel particulate filter 20 preferably includes the ceramic article 10 having the end-plugged configuration described above mounted within a preferably metal canister 30. The filter 20 includes the plurality of axially extending end-plugged inlet cells 12 and outlet cells 14 traversing through it. In operation, diesel soot is trapped and stored in the inlet cells 12 and in the porous walls 18 of the filter. A preferably annular mat or other fibrous or high-temperature compliant material 40 is used to position and support the ceramic article 10 within the canister 30. Preferably, end elements 50 locate and retain the article 10 in the axial direction relative to the canister 30. The diesel particulate filter 20 is preferably mounted in an exhaust system 60 of a vehicle (only a portion of the vehicle is shown for clarity) as illustrated in FIG. 3. In particular, the filter 20 is interconnected to an engine 70 by one or more pipes 80. The system 60 may also include a muffler 90 and additional pipes 81, 82. In operation, the filter 20 removes particles (soot) entrained in the exhaust.

To more fully illustrate the invention, the following non-limiting examples are presented illustrating compositions and properties which may be achieved.

EXAMPLES

A batch is prepared by compounding raw materials, and then mixing them with the sintering aid and organic processing aid constituents in proportions as provided in the following Table I to form a mixture. The composition of the ceramic article produced is also provided. Such compositions, throughout the various examples given this specification, are calculated and expressed on a weight percent oxide basis. It should be understood that expressing such compositions on a weight percent oxide basis has been conventional in the art, although it is recognized that such oxides may not actually exist in the ceramic in their free form, but instead, may exist in a state where the oxygen atoms are bonded within crystalline or glass structures or phases formed in the ceramic.

TABLE I

|  | wt. % |
|---|---|
| Raw Materials |  |
| $SiO_2$ | 10.19 |
| $SrCO_3$ | 8.00 |
| $CaCO_3$ | 1.38 |
| $Al_2O_3$ | 46.57 |
| $Al(OH)_3$ | 3.71 |
| $TiO_2$ | 29.95 |
| Sintering Additive |  |
| $La_2O_3$ | 0.20 |
| Pore Former, Binder, Lubricant, Solvent |  |
| Graphite (Pore Former) | 30.0 |
| Methylcellulose (Binder) | 4.50 |
| Tall Oil (Lubricant) | 1.00 |
| TriEthanol Amine | 0.15 |
| Water (Solvent) | 17.00 |
| Oxide |  |
| $Al_2O_3$ | 51.8 |
| $TiO_2$ | 30.9 |
| $SiO_2$ | 10.5 |
| SrO | 5.8 |
| CaO | 0.8 |
| $La_2O_3$ | 0.2 |
| Total | 100.0 |

The mixture is kneaded in a stainless steel muller to form a plastic mass, which is then extruded through a die to form a green body having a honeycomb structure having a cell density of about 300 cells/in$^2$ (46.5 cells/cm$^2$), a wall thickness of preferably about 0.012 inch (305 μm), and a diameter of 1 inch to 10 inches. The samples were dried and fired in an electric furnace having an air atmosphere. During firing, the top temperature is preferably less than 1500° C., more preferably between about 1350 to 1450° C., more preferably yet between 1400 to 1450° C., and more preferably about 1435° C. The top temperature is preferably held for a time sufficient to form a predominant aluminum titanate phase crystal structure in the fired article. Most preferably, the hold time is 8 hours or less, most preferably between 6 and 8 hours. The hold is followed by cooling to room temperature (RT).

The fired article samples having a honeycomb structure are characterized for Coefficient of Thermal Expansion (CTE), porosity, Median Pore Size (MPS), and Modulus Of Rupture (MOR). CTE as provided by dilatometry over a temperature range of RT to 1000° C. Porosity and MPS are provided by mercury intrusion porosimetry, and MOR is provided by four-point method on bars cut with their long axis parallel to the extrusion direction. The data obtained for one example (Ex. 1) is summarized in the following Table II.

TABLE II

| Properties for Ex. 1 | | |
|---|---|---|
| Properties | Inventive Comp. | Comparative Comp. |
| CTE ($10^{-7}$/° C.) | 7.4 | 8.7 |
| Porosity (% by volume) | 52.2 | 46.0 |
| MPS (μm) | 14.6 | 16.9 |
| MOR (psi) | 154 | 180 |

Also provided in Table II are measured values of CTE, porosity, MPS, and MOR for a comparative sample processed from a similar batch as provided in Table I, but absent the sintering additive. Consequently the comparative sample is fired at a top temperature of 1465° C. for 6 hours. The comparative sample also exhibits desired properties for DPF applications.

In comparison, the properties of the inventive composition sample are similar to, even better than the properties of the comparative sample. Lanthanum oxide is effective as a sintering additive in combination with the other constituents to promote low CTE and coarsen pore size without reducing porosity or having a significantly detrimental effect on the strength. Therefore, in the present invention it has been shown that aluminum titanate-based bodies can be manufactured at reduced firing temperatures and with a broad firing window without negatively impacting the resulting properties.

Additional examples are provided in Tables III and IV below. These examples are manufactured as described above. Each of the examples has been fired at multiple temperatures to illustrate variations in properties that may result.

TABLE III

| | Ex. 2–5 | | | |
|---|---|---|---|---|
| | Ex. 2 | Ex. 3 | Ex. 4 | Ex. 5 |
| Raw Materials (wt. %) | | | | |
| $Al_2O_3$ | 49.61 | 48.90 | 46.76 | 49.60 |
| $TiO_2$ | 29.83 | 29.89 | 30.07 | 29.89 |
| $SiO_2$ | 9.78 | 9.12 | 7.14 | 9.12 |
| $SrCO_3$ | 9.58 | 8.93 | 6.99 | 8.93 |
| $La_2O_3$ | 0.97 | 2.92 | 8.81 | 2.22 |
| $Fe_2O_3$ | 0.23 | 0.23 | 0.23 | 0.23 |

TABLE III-continued

| | Ex. 2–5 | | | |
|---|---|---|---|---|
| | Ex. 2 | Ex. 3 | Ex. 4 | Ex. 5 |
| Pore Former, Binder, Lubricant, Solvent (wt. %) | | | | |
| Pore Former | 0.0 | 0.0 | 0.0 | 0.0 |
| Binder | 6.00 | 6.00 | 6.00 | 6.00 |
| Lubricant | 0.15 | 0.15 | 0.15 | 0.15 |
| Solvent | 21.5 | 21.5 | 21.5 | 21.5 |
| Oxide (wt. %) | | | | |
| Alumina ($Al_2O_3$) | 51.1 | 50.2 | 47.8 | 51.0 |
| Titania ($TiO_2$) | 30.7 | 30.7 | 30.7 | 30.7 |
| Silica ($SiO_2$) | 10.1 | 9.4 | 7.3 | 9.4 |
| Stronitia (SrO) | 6.9 | 6.4 | 5.0 | 6.4 |
| Lantanum Oxide ($La_2O_3$) | 1.0 | 3.0 | 9.0 | 2.3 |
| Ferric Oxide ($Fe_2O_3$) | 0.2 | 0.2 | 0.2 | 0.2 |
| Total: | 100.0 | 100.0 | 100.0 | 100.0 |
| Properties | | | | |
| CTE ($10^{-7}$/° C.) @ 1425° C. | 10 | 8 | 24 | 3 |
| CTE ($10^{-7}$/° C.) @ 1455° C. | 6 | 5 | 11 | 0 |
| CTE ($10^{-7}$/° C.) @ 1485° C. | 2 | 1 | 8 | −1 |
| Porosity (%) @ 1425° C. | 45 | 41 | 43 | 42 |
| Porosity (%) @ 1455° C. | 46 | 38 | 29 | 42 |
| Porosity (%) @ 1485° C. | 38 | 30 | 21 | 31 |
| MPS (μm) @ 1425° C. | 15 | 16 | 19 | 16 |
| MPS (μm) @ 1455° C. | 17 | 19 | 23 | 17 |
| MPS (μm) @ 1485° C. | 18 | 21 | 24 | 20 |

For Ex. 2-5, the batch components were provided as follows. The alumina was RMA Alumina (500 mesh); silica was Silverbond 200; and the titania was Titanox Kronos 3020. No pore former was used for Ex. 2-5. Binder for these batches was A4M Methocel. Oleic Acid was employed as a lubricant, and water was the solvent. As should be recognized, a large number of the compositions provide porosity of greater than 30% by volume, or even greater than 40%; with those fired at 1425° C. having porosity of greater than 40% without the use of a pore former. The compositions exhibit CTE between RT-1000° C. of less than $25 \times 10^{-7}$/° C.; with a large majority of the compositions exhibiting CTE of less than $15 \times 10^{-7}$/° C. or less, or even $10 \times 10^{-7}$/° C. or less, and with certain embodiments having a CTE of less than $5 \times 10^{-7}$/° C. MPS for the examples 2-5 was 10 μm or more; with some exhibiting MPS of 15 μm or more, or even MPS of 20 μm or more. Excellent CTE, porosity, and MPS may be obtained while firing with top firing temperatures of less than 1500° C., or even lower than 1450° C. Several embodiments achieved porosity of greater than 30% by volume in combination with CTE between RT-1000° C. of $10 \times 10^{-7}$/° C. or less. Examples 2-5 above and 6-7 below were samples having 1 inch diameter, 200 cells/inch$^2$ and 0.016 inch wall thickness.

TABLE IV

| | Ex. 6–7 | |
|---|---|---|
| Raw Materials (wt. %) | Ex. 6 | Ex. 7 |
| $SiO_2$ | 5.41 | 6.40 |
| $SrCO_3$ | 6.64 | 4.46 |
| $Al_2O_3$ | 51.02 | 54.02 |
| $Fe_2O_3$ | 0.00 | 0.00 |
| $TiO_2$ | 33.88 | 33.07 |
| $La_2O_3$ | 3.05 | 2.05 |

TABLE IV-continued

Ex. 6–7

| Pore Former, Binder, Lubricant, Solvent | wt. % | wt. % |
|---|---|---|
| Pore Former | 25.0 | 25.0 |
| Binder | 4.50 | 4.50 |
| Lubricant | 1.00 | 1.00 |
| Solvent | 24.0 | 24.0 |

| Oxide | wt. % | wt. % |
|---|---|---|
| Alumina ($Al_2O_3$) | 52.8 | 55.4 |
| Titania ($TiO_2$) | 33.8 | 32.8 |
| Silica ($SiO_2$) | 5.5 | 6.5 |
| Stronitia (SrO) | 4.8 | 3.2 |
| Lantanum Oxide ($La_2O_3$) | 3.1 | 2.1 |
| Iron Oxide ($Fe_2O_3$) | 0.0 | 0.0 |
| Total: | 100.0 | 100.0 |

| Properties | Ex. 6 | Ex. 7 |
|---|---|---|
| CTE ($10^{-7}/°$ C.) @ 1400° C. | — | 7 |
| CTE ($10^{-7}/°$ C.) @ 1450° C. | 9 | — |
| Porosity (%) @ 1400° C. | — | 46 |
| Porosity (%) @ 1450° C. | 54 | — |
| MPS (μm) @ 1400° C. | — | 11 |
| MPS (μm) @ 1450° C. | 13 | — |

For Ex. 6-7, the batch components were provided as follows. The alumina was A-10 Alumina available from Alcoa; silica was Silverbond 200; and the titania was Dupont Ti-Pure R-100. Asbury A625 graphite pore former was used for Ex. 6-7. Binder for these batches was A4M Methocel. Oleic Acid was employed as the lubricant, and the solvent was water. The wt. % given above for the processing aids is given as a percentage of the total weight of the batch components. As can be seen, the compositions of examples 6-7 provide porosity of greater than 40%, or even 45%; and in one embodiment, greater than 50%. The compositions also exhibit CTE of less than $25×10^{-7}/°$ C.; more preferably less than $10×10^{-7}/°$ C. MPS for examples 6-7 were 10 μm or more. Additional examples 8-15 including calcium and clays are shown below in Table V below.

TABLE V

Ex. 8-15

| Raw Materials (wt. %) | Ex. 8 | Ex. 9 | Ex. 10 | Ex. 11 | Ex. 12 | Ex. 13 | Ex. 14 | Ex. 15 |
|---|---|---|---|---|---|---|---|---|
| $SiO_2$ | 10.21 | 10.21 | 5.29 | 5.22 | 10.16 | 7.9 | 8.01 | 10.27 |
| $SrCO_3$ | 8.02 | 8.02 | 4.86 | 4.78 | 8.02 | 4.83 | 4.9 | 8.07 |
| $CaCO_3$ | 1.38 | 1.38 | 0.0 | 11.55 | 1.38 | 3.81 | 0.0 | 0.0 |
| Clay | 0.0 | 0.0 | 11.73 | 3.75 | 0.0 | 5.83 | 5.92 | 0.0 |
| Calcium Aluminate | 0.0 | 0.0 | 8.06 | 0.0 | 0.0 | 0.0 | 8.18 | 2.93 |
| $Al_2O_3$ | 46.66 | 46.66 | 36.49 | 41.58 | 46.66 | 44.22 | 39.09 | 45.37 |
| $TiO_2$ | 30.02 | 30.02 | 29.83 | 29.44 | 30.02 | 29.7 | 30.13 | 29.61 |
| $Al(OH)_3$ | 3.72 | 3.72 | 3.74 | 3.68 | 3.72 | 3.71 | 3.77 | 3.75 |
| $La_2O_3$ | 0.1 | 0.2 | 0.2 | 0.4 | 0.04 | 0.4 | 0.2 | 0.4 |
| | wt. % | wt. % | wt. % | wt. % | wt. % | wt. % | wt. % | wt. % |
| Pore Former, Binder, Lubricant, Solvent | | | | | | | | |
| Pore Former | 30.0 | 30.0 | 30.0 | 30.0 | 30.0 | 30.0 | 30.0 | 30.0 |
| Binder | 4.50 | 4.50 | 4.50 | 4.50 | 4.50 | 4.50 | 4.50 | 4.50 |
| Lubricant | 1.00 | 1.00 | 1.00 | 1.00 | 1.00 | 1.00 | 1.00 | 1.00 |
| TriEthanol Amine | 0.15 | 0.15 | 0.15 | 0.15 | 0.15 | 0.15 | 0.15 | 0.15 |
| Solvent | 17.0 | 17.0 | 17.0 | 17.0 | 17.0 | 17.0 | 17.0 | 17.0 |
| Oxide | | | | | | | | |
| ($SiO_2$) Silica | 10.65 | 10.64 | 11.24 | 11.22 | 10.62 | 11.15 | 11.16 | 10.63 |
| (SrO) Strontia | 5.88 | 5.86 | 3.56 | 3.55 | 5.86 | 3.56 | 3.56 | 5.86 |
| (CaO) | 0.81 | 0.81 | 2.24 | 2.23 | 0.8 | 2.24 | 2.25 | 0.81 |
| ($Al_2O_3$) Alumina | 51.23 | 51.18 | 51.62 | 51.41 | 51.07 | 51.43 | 51.63 | 51.67 |
| ($TiO_2$) Titania | 31.33 | 31.3 | 31.13 | 31.17 | 31.23 | 31.2 | 31.19 | 30.62 |
| ($La_2O_3$) | 0.10 | 0.21 | 0.21 | 0.42 | 0.42 | 0.42 | 0.21 | 0.41 |
| Total: | 100.0 | 100.0 | 100.0 | 100.0 | 100.0 | 100.0 | 100.0 | 100.0 |

| Properties | Ex. 8 | Ex. 9 | Ex. 10 | Ex. 11 | Ex. 12 | Ex. 13 | Ex. 14 | Ex. 15 |
|---|---|---|---|---|---|---|---|---|
| CTE ($10^{-7}/°$ C.) @ 1475° C. | 3.1 | — | — | — | — | — | — | — |
| CTE ($10^{-7}/°$ C.) @ 1455° C. | 8.4 | 6.9 | — | — | — | — | — | — |
| CTE ($10^{-7}/°$ C.) @ 1435° C. | 9.4 | 7.4 | 9.3 | — | — | 7.9 | 14.2 | — |
| CTE ($10^{-7}/°$ C.) @ 1400° C. | — | — | — | 17.3 | 18.1 | 16.7 | — | — |
| CTE ($10^{-7}/°$ C.) @ 1380° C. | — | — | 24.6 | 24.2 | 26.9 | 20.4 | — | 24.4 |
| Porosity (%) @ 1475° C. | 46.6 | — | — | — | — | — | — | — |
| Porosity (%) @ 1455° C. | 51.2 | 49.9 | — | — | — | — | — | — |
| Porosity (%) @ 1435° C. | 54.6 | 52.2 | 44.3 | 44.6 | — | 45.7 | 50.8 | — |
| Porosity (%) @ 1400° C. | — | — | — | 48.9 | 51.4 | 48.9 | — | — |

TABLE V-continued

Ex. 8-15

| Raw Materials (wt. %) | Ex. 8 | Ex. 9 | Ex. 10 | Ex. 11 | Ex. 12 | Ex. 13 | Ex. 14 | Ex. 15 |
|---|---|---|---|---|---|---|---|---|
| Porosity (%) @ 1380° C. | — | — | 54.1 | 52.3 | 54.3 | 50.9 | — | 52.7 |
| MPS (μm) @ 1475° C. | 16.6 | 16.2 | — | — | — | — | — | — |
| MPS (μm) @ 1455° C. | 15.4 | 14.6 | — | — | — | — | — | — |
| MPS (μm) @ 1435° C. | 14.3 | — | 11.6 | 13.2 | — | 13.8 | 13.7 | — |
| MPS (μm) @ 1400° C. | — | — | — | 11.4 | 13.9 | 12.7 | — | — |
| MPS (μm) @ 1380° C. | — | — | 7.8 | 7.9 | 8.1 | 9.1 | — | 7.5 |
| MOR (psi) @ 1475° C. | 162.7 | — | — | — | — | — | — | — |
| MOR (psi) @ 1455° C. | 151.9 | — | — | — | — | — | — | — |
| MOR (psi) @ 1435° C. | 163.8 | 153.7 | — | — | — | — | — | — |

For Ex. 8-15, the batch components were provided as follows. The alumina was A-10 Alumina available from Alcoa; silica was Silverbond 200; and the titania was Dupont Ti-Pure R-100. Asbury A625 graphite pore former. Binder for these batches was A4M Methocel. Tall oil from S & S Chemical was employed as the lubricant, and the solvent was water. The lubricant system also included Tri-Ethanol Amine 99® from Dow Corning. The wt. % given above for the processing aids is given as a percentage of the total weight of the batch components. Each example was held at the top temperature for 6 hours.

As can be seen, the compositions of examples 8-15 provide porosity of greater than 40%, or even 45%; and in several embodiments, 50% or greater. The compositions also exhibit CTE of less than $25 \times 10^{-7}/°$ C.; more preferably less than $15 \times 10^{-7}/°$ C., with many being less than $10 \times 10^{-7}/°$ C. CTE of less than $10 \times 10^{-7}/°$ C. may be achieved by firing at less than or equal to 1500° C. and greater than or equal to 1435° C. with many of these compositions. MOR is greater than 150 psi when fired at less than 1500° C. Median pore size is greater than 10 microns for many examples when fired between 1400 and 1500° C.

Figure 4:
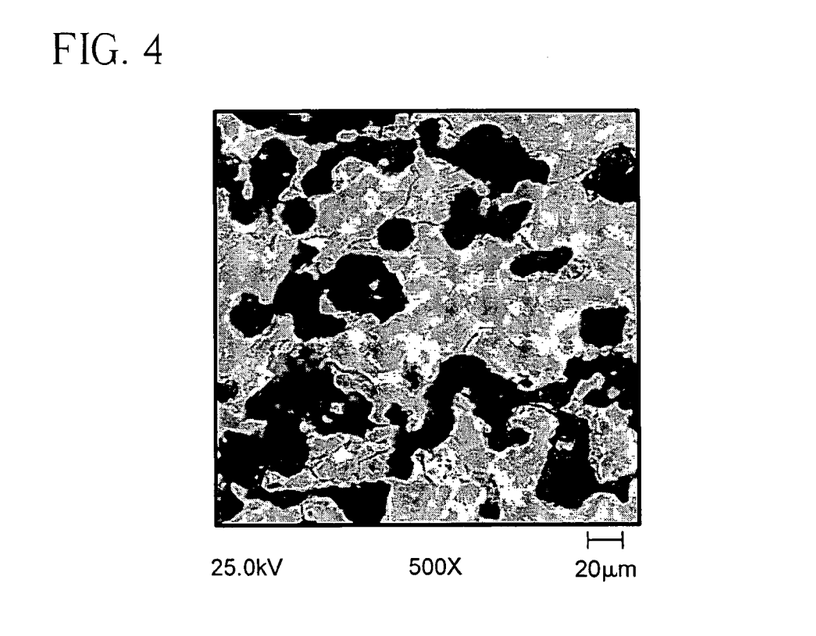
FIGS. 4 and 5 are 500× and 1000× micrographs, respectively, of representative internal portions of the ceramic article according to the invention illustrating the predominantly aluminum-titanate phase structure.
Figure 5:
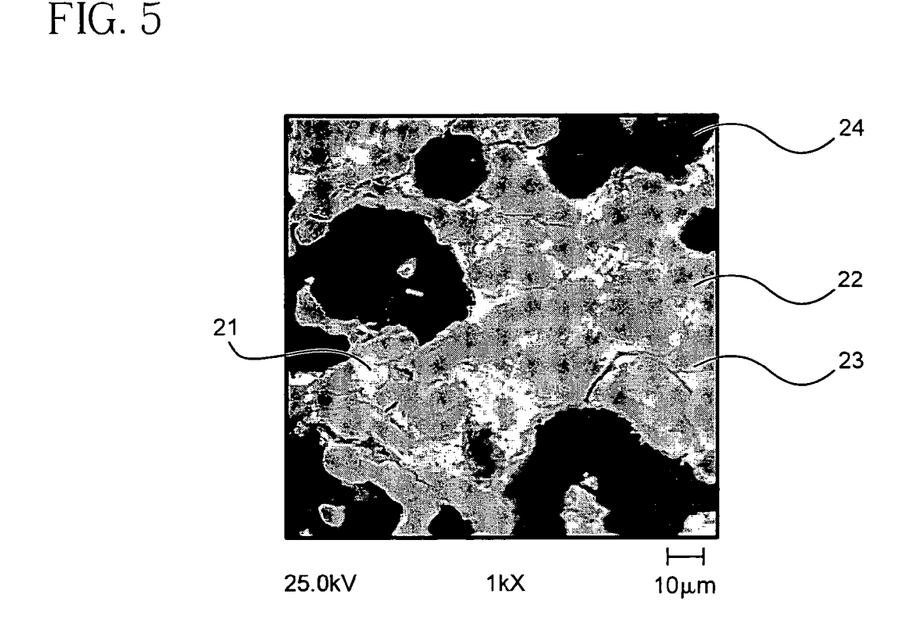

For the examples of the ceramic article according to the invention given herein, a predominant crystal phase in the ceramic article is aluminum titanate. Preferably also, the ceramic article according to the invention is substantially devoid of mullite. The fired ceramic may also preferably include a minor phase of an alkaline earth metal feldspar, and may include an even lesser phase of alumina. These phases may be noncrystaline, such as a glassy or glass phase. FIGS. 4 and 5 illustrate 500× and 1000× polished surface micrographs, respectively, of representative internal portions of the ceramic article showing its interconnected internal porosity, microcracking, and the predominantly aluminum-titanate crystal phase. Other solid phases may be present in the ceramic, as identified above. The bright white minor phase (labeled 21 in FIG. 5) is strontium feldspar, and is preferably present in about 0-50% by volume; more preferably 10-30%. Depending upon the alkaline earth metal used in the composition, the strontium feldspar may be substituted for by calcium feldspar or barium feldspar, or a combination thereof. The light grey phase (labeled 22 in FIG. 5) is the predominant aluminum titanate phase, and is preferably present in about 55-95% by volume; more preferably 60-80%. Alumina is the minor dark grey phase (labeled 23 in FIG. 5) and is preferably present in about 0-50% by volume; more preferably in about 0-20%. The black portion (labeled 24 in FIG. 5) is internal porosity.

Figure 6:
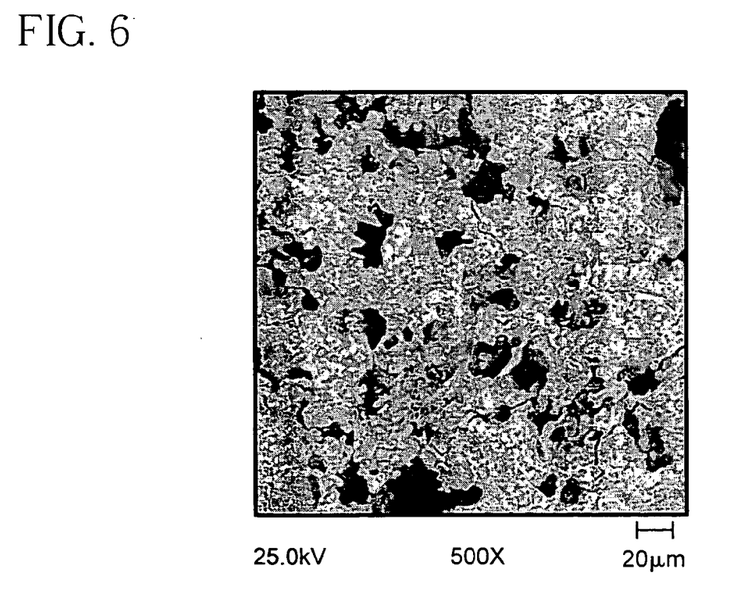
FIGS. 6 and 7 are 500× and 1000× micrographs, respectively, of representative surface portions of the ceramic article according to the invention.
Figure 7:
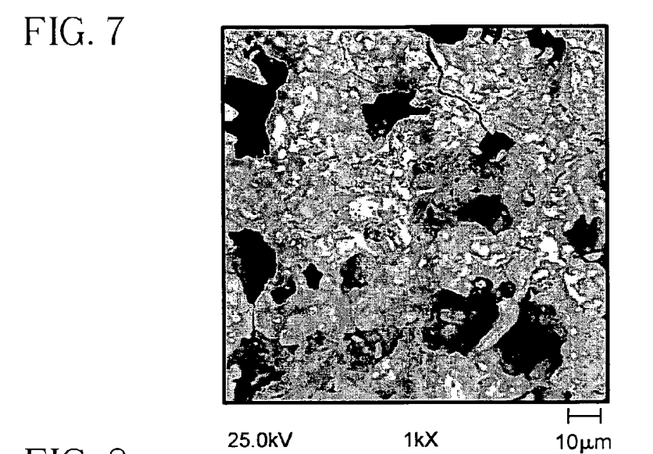

FIGS. 6 and 7 illustrate representative, as fired surfaces, of the ceramic article according to the invention illustrating the surface roughness, surface and interconnected porosity (black areas), as well as the micro-cracking. FIG. 6 is shown at 500× magnification, whereas FIG. 7 is at 1000× magnification.

The ceramic article of the invention preferably has a material composition including the elements aluminum, titanium, silicon, and an alkaline earth metal (such as at least one selected from the group consisting of strontium, calcium, barium, and combinations thereof), and a rare earth metal. Combinations of Strontium and calcium are most preferred. The rare earth is preferably selected from the group consisting of yttrium, lanthanum, and combinations thereof. Lanthanum is most preferred.

More preferably, the ceramic article has a composition that comprises, as expressed on a weight percent oxide basis, 40-65% $Al_2O_3$; 25-40% $TiO_2$; 3-12% $SiO_2$; 2-10% of an alkaline earth metal oxide (such as at least one alkaline earth oxide selected from the group consisting of SrO, CaO, BaO, and combinations thereof); and 0.01-10% of a rare earth oxide, such as $La_2O_3$, $Y_2O_3$, or combinations thereof. Most preferably, the composition includes the combination of 2-10% SrO and 0.01-10% $La_2O_3$. However, the composition may optionally include various combinations of the alkaline earth oxides SrO, BaO, and CaO with $La_2O_3$, provided that the total oxide wt. % of the alkaline earth oxides is between 2-10%. Combinations of SrO, CaO, and $La_2O_3$ are most preferred.

According to a more preferred ranges, the composition consists essentially of an oxide composition, calculated on a weight percent oxide basis, of 45-60% $Al_2O_3$; 28-36% $TiO_2$; 5-12% $SiO_2$; 3-8% SrO; 0.1 to 5% CaO; and 1-9% $La_2O_3$.

Ca, Sr, and Ba in this composition range preferably form alkaline earth feldspar crystalline phases and/or glassy phases in the final fired composition. The predominant difference in varying ratios of these alkali-earth elements being firing temperature. Mixtures of the alkaline earths tend to result in lower firing temperature and also a wider firing window and, thus, combinations are desired. For example combinations of Ca and Sr are most preferred and are very effective at broadening the firing window. Further, it should be recognized that Yttrium, and combinations of yttrium and lanthanum are nearly as effective as a sintering aid when used in combination with Sr, Ca, Ba, or combinations thereof.

The ceramic according to the invention may optionally also include a small amount of iron (Fe). In particular, the addition, if present, is also expressed in terms of weight percent on an oxide basis of $Fe_2O_3$. $Fe_2O_3$ may be added, as expressed on a weight percent oxide basis, in amounts less than 2.0%, more preferably less than 1.0%, and most preferably between 0.01 and 0.35%. The addition of $Fe_2O_3$ results in a solid-solution of Ti and Fe in the aluminum titanate phase, slowing down the decomposition rate of aluminum titanate when placed in service in oxidization conditions below about 1300° C. Low iron, i.e., less than 2.0%, more preferably less than 0.5% on an oxide weight percent basis, is desirable in canned applications, in that it reduces growth due to thermal cycling. Further, the composition is preferably magnesium free, in that no more than very small amounts of magnesium (for example, less than 0.5% by weight), for example, due to impurities in the batch materials, are present therein.

According to another broad aspect of the invention, the composition of the ceramic article may alternately be characterized in terms of the possible system components. In particular, the composition, according to the invention comprises, as expressed on a weight percent oxide basis, a $(Al_2O_3.TiO_2)+b$ $(CaO.Al_2O_3.2SiO_2)+c$ $(SrO.Al_2O_3.2SiO_2)+d$ $(BaO.Al_2O_3.2SiO_2)+e$ $(3Al_2O_3.2SiO_2)+f$ $(Al_2O_3)+g$ $(SiO_2)+h$ $(Fe_2O_3.TiO_2)+i$ $(La_2O_3)+j$ $(La_2O_3.4TiO_2.6Al_2O_3)$ where a, b, c, d, e, f, g, h, i, j and k are weight fractions of each component such that (a+b+c+d+e+f+g+h+i+j=1.000). Preferably, a-k for the composition are as follows: $0.5 \leq a \leq 0.95$, $0.0 \leq b \leq 0.5$, $0.0 \leq c \leq 0.5$, $0.0 \leq d \leq 0.5$, $0.0 \leq e \leq 0.5$, $0.0 \leq f \leq 0.25$, $0.0 \leq g \leq 0.1$, $0.0 \leq h \leq 0.03$, and i+j+k>0.001 and b+c+d>0.001. Although the composition is expressed in these terms, the only crystalline phase required to be present in the final fired body is aluminum titanate. The other phases may be non-stoichiometric or noncrystaline, for example.

More preferably, the composition, according to embodiments of the invention comprises, as expressed on a weight percent oxide basis, a $(Al_2O_3.TiO_2)+b$ $(CaO.Al_2O_3.2SiO_2)+c$ $(SrO.Al_2O_3.2SiO_2)+d$ $(BaO.Al_2O_3.2SiO_2)+e$ $(3Al_2O_3.2SiO_2)+f$ $(Al_2O_3)+g$ $(SiO_2)+h$ $(Fe_2O_3.TiO_2)+i$ $(La_2O_3)+j$ $(La_2O_3.4TiO_2.6Al_2O_3)+k$ $(LaAlO_3)$ where a, b, c, d, e, f, g, h, i, j and k are weight fractions of each component such that (a+b+c+d+e+f+g+h+i+j=1.000). Preferably, a-k for the composition are as follows: $0.5 \leq a \leq 0.95$, $0.0 \leq b \leq 0.5$, $0.0 \leq c \leq 0.5$, $0.0 \leq d \leq 0.5$, $0.0 \leq e \leq 0.5$, $0.0 \leq f \leq 0.15$, $0.0 \leq g \leq 0.1$, $0.0 \leq h \leq 0.01$, and i+j+k>0.001 and b+c+d>0.01.

Figure 9:
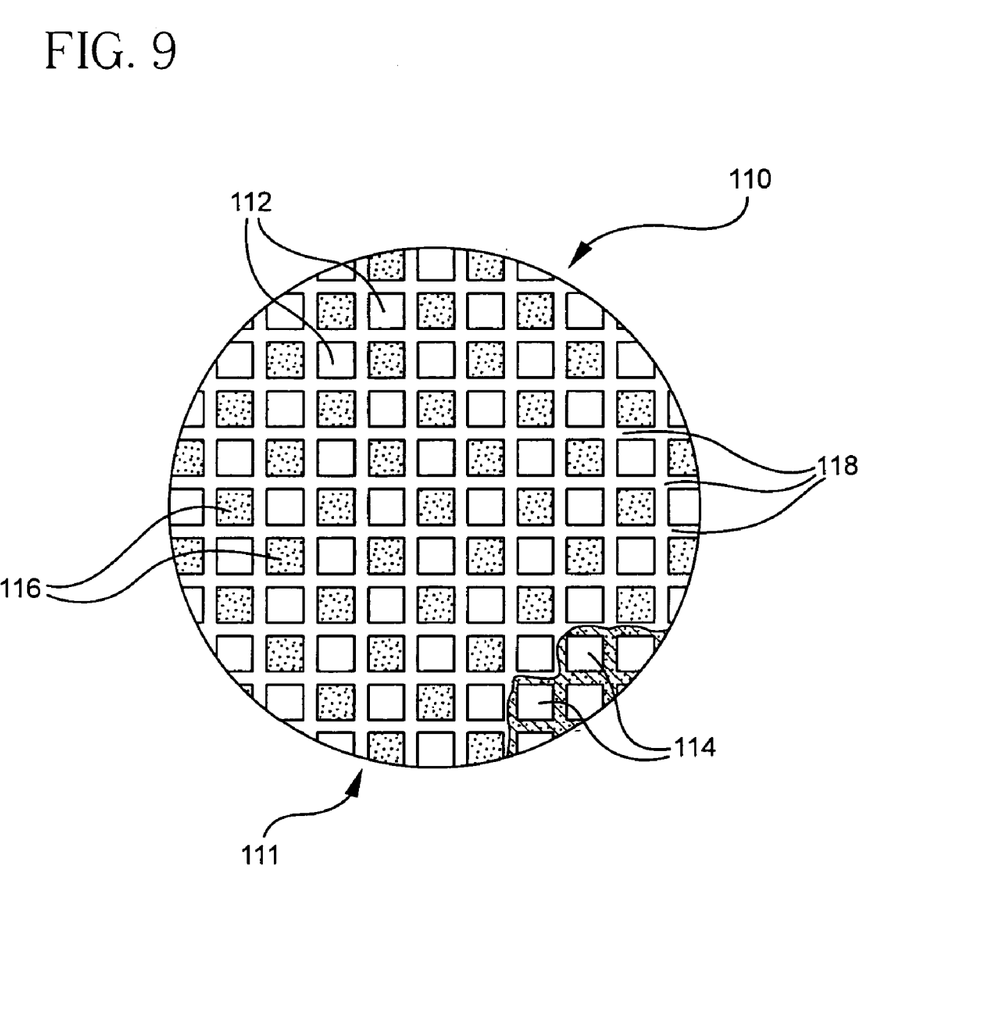
FIG. 9 is a partial frontal view illustrating another embodiment of aluminum titanate ceramic article according to the invention shown in the form of an end-plugged wall-flow filter.

FIG. 9 illustrates a partially cross-sectioned, partial inlet end view of a preferred embodiment of the ceramic article 110 according to further aspects of the invention. In particular, this embodiment of article 110 is configured as wall-flow filter the same as described with reference to FIG. 1, with outlet cells 114 plugged at the inlet end 111 by plugs 116 and inlet cells 112 plugged at the outlet end by plugs (not shown for clarity), but where the inlet cells 112 and outlet cells 114 have non-equal transverse cross-sections, which are preferably square. Such non-equal areas are defined by the respective areas circumscribed by the respective transverse surfaces of the intersecting cell walls 118. Preferred thicknesses of walls 118 for the article 110 are less than 0.06 in (1.52 mm). Cell densities are preferably 10-800 cells/in$^2$ (1.6-124 cells/cm$^2$). The article 110 preferably exhibits porosity of greater than 40% by volume, preferable median pore size of greater than 10 μm, and preferable coefficient of thermal expansion, as measured between RT-1000° C., of $10 \times 10^{-7}$/° C. or less.

While various embodiments of the inventions have been shown and described, it is understood that the invention is not limited thereto. The present invention may be changed, modified and further applied by those skilled in the art.

Therefore, this invention is not limited to the detail shown and previously described, but also includes all such changes or modifications.

What is claimed:

1. An aluminum titanate ceramic article, comprising: a predominant crystal phase of aluminum titanate and a material composition including aluminum, titanium, silicon, an alkaline earth metal, and a rare earth metal oxide in an amount less than 0.5%, as expressed on a weight percent oxide basis, wherein the alkaline earth metal is at least one selected from the group consisting of strontium, calcium, barium, and combinations thereof.

2. The aluminum titanate ceramic article of claim 1, wherein the rare earth metal oxide is at least one selected from the group consisting of yttrium oxide, lanthanum oxide, and combinations thereof.

3. The ceramic article of claim 2, wherein the composition further comprises, as expressed on a weight percent oxide basis, a $(Al_2O_3.TiO_2)+b$ $(CaO.Al_2O_3.2SiO_2)+c$ $(SrO.Al_2O_3.2SiO_2)+d$ $(BaO.Al_2O_3.2SiO_2)+e$ $(3Al_2O_3.2SiO_2)+f$ $(Al_2O_3)+g$ $(SiO_2)+h$ $(Fe_2O_3.TiO_2)+i$ $(La_2O_3)+j$ $(La_2O_3.4TiO_2.6Al_2O_3)+k$ $(LaAlO_3)$ where a, b, c, d, e, f, g, h, i, j and k are weight fractions of each component such that (a+b+c+d+e+f+g+h+i+j+k=1.000), and where $0.5 < a \leq 0.95$, $0.0 \leq b \leq 0.5$, $0.0 \leq c \leq 0.5$, $0.0 \leq d \leq 0.5$, $0.0 \leq e \leq 0.5$, $0.0 \leq f \leq 0.25$, $0.0 \leq g \leq 0.1$, $0.0 \leq h \leq 0.03$, and i+j+k>0.001 and b+c+d>0.001.

4. The ceramic article of claim 2, wherein the composition further comprises, as expressed on a weight percent oxide basis, a $(Al_2O_3.TiO_2)+b$ $(CaO.Al_2O_3.2SiO_2)+c$ $(SrO.Al_2O_3.2SiO_2)+d$ $(BaO.Al_2O_3.2SiO_2)+e$ $(3Al_2O_3.2SiO_2)+f$ $(Al_2O_3)+g$ $(SiO_2)+h$ $(Fe_2O_3.TiO_2)+i$ $(La_2O_3)+j$ $(La_2O_3.TiO_2.Al_2O_3)+k$ $(LaAlO_3)$ where a, b, c, d, e, f, g, h, i, j and k are weight fractions of each component such that (a+b+c+d+e+f+g+h+i+j+k=1.00), and where $0.5 < a \leq 0.95$, $0.0 \leq b \leq 0.5$, $0.0 \leq c \leq 0.5$, $0.0 \leq d < 0.5$, $0.0 \leq e \leq 0.5$, $0.0 \leq f \leq 0.25$, $0.0 \leq g \leq 0.1$, $0.0 \leq h \leq 0.005$, and i+j+k>0.001 and b+c+d>0.01.

5. The ceramic article of claim 2, wherein the composition further comprises, as expressed on a weight percent oxide basis: 40-65% $Al_2O_3$; 25-40% $TiO_2$; 3-12% $SiO_2$; 2-10% of at least one alkaline earth oxide selected from the group consisting of SrO, CaO, BaO, and combinations thereof; and 0.01-0.5% of at least one rare earth oxide selected from the group consisting of $La_2O_3$, $Y_2O_3$, and combinations thereof.

6. The ceramic article of claim 5, further comprising $Fe_2O_3$ of between 0.01 and 0.35%, expressed on a weight percent oxide basis.

7. The ceramic article of claim 5, comprising $La_2O_3$ in an amount less than 0.5% calculated on a weight percent oxide basis.

8. The ceramic article of claim 2, consisting essentially of: an oxide composition, calculated on a weight percent oxide basis, of 45-60% $Al_2O_3$; 28-36% $TiO_2$; 5-12% $SiO_2$; 3-8% SrO; 0.1 to 5% CaO; and an amount less than 0.5% $La_2O_3$.

9. The ceramic article of claim 1, comprising a porosity of greater than 40% by volume.

10. The ceramic article of claim 1, comprising a median pore size of greater than 10 μm.

11. The ceramic article of claim 1, comprising a coefficient of thermal expansion as measured between RT-1000° C. of $15 \times 10^{-7}$/° C. or less.

12. The ceramic article of claim 1, comprising a coefficient of thermal expansion as measured between RT-1000° C. of $10 \times 10^{-7}/°$ C. or less and a porosity of greater than 40% by volume.

13. A diesel particulate filter including the ceramic article of claim 1, said filter having a plurality of axially extending end-plugged inlet and outlet cells.

14. A system comprising the diesel particulate filter of claim 13, said system including an engine and a pipe interconnecting the engine to the diesel particulate filter.

15. An aluminum titanate ceramic article, comprising: a predominant crystal phase of aluminum titanate and a minor phase of an alkaline earth metal feldspar comprised of at least one element selected from the group of strontium, calcium, barium, and combinations thereof, and a material composition including aluminum, titanium, and silicon, and a rare earth metal oxide in an amount less than 0.5%, as expressed on a weight percent oxide basis.

16. An aluminum titanate ceramic article of claim 15 wherein the rare earth metal oxide is selected from the group consisting of yttrium oxide, lanthanum oxide, and combinations thereof.

17. An aluminum titanate ceramic article of claim 15 further comprising a minor phase of alumina.

18. The aluminum titanate ceramic article of claim 2, wherein the composition comprises strontium oxide, calcium oxide, and lanthanum oxide.

19. The aluminum titanate ceramic article of claim 18, wherein the composition comprises less than 0.35% iron oxide, as expressed on a weight percent oxide basis.

20. The aluminum titanate ceramic article of claim 19, wherein the composition is magnesium free.

21. The aluminum titanate ceramic article of claim 16, wherein the composition comprises strontium oxide, calcium oxide, and lanthanum oxide.

22. The aluminum titanate ceramic article of claim 21, wherein the composition comprises less than 0.35% iron oxide, as expressed on a weight percent oxide basis.

23. The aluminum titanate ceramic article of claim 21, wherein the composition is magnesium free.

\* \* \* \* \*